United States Patent
Yao et al.

(10) Patent No.: US 12,482,249 B2
(45) Date of Patent: Nov. 25, 2025

(54) POLY-SCALE KERNEL-WISE CONVOLUTION FOR HIGH-PERFORMANCE VISUAL RECOGNITION APPLICATIONS

(71) Applicant: Intel Corporation, Santa Clara, CA (US)

(72) Inventors: Anbang Yao, Beijing (CN); Xiao Zhou, Shanghai (CN); Guangli Zhang, Shanghai (CN); Yu Zhang, Beijing (CN); Dian Gu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 18/017,050

(22) PCT Filed: Sep. 7, 2020

(86) PCT No.: PCT/CN2020/113760
§ 371 (c)(1),
(2) Date: Jan. 19, 2023

(87) PCT Pub. No.: WO2022/047783
PCT Pub. Date: Mar. 10, 2022

(65) Prior Publication Data
US 2024/0005649 A1   Jan. 4, 2024

(51) Int. Cl.
*G06V 10/82* (2022.01)
*G06V 10/44* (2022.01)
*G06V 10/77* (2022.01)

(52) U.S. Cl.
CPC ............ *G06V 10/82* (2022.01); *G06V 10/449* (2022.01); *G06V 10/7715* (2022.01)

(58) Field of Classification Search
CPC ... G06V 10/82; G06V 10/7715; G06V 10/449
See application file for complete search history.

(56) References Cited

U.S. PATENT DOCUMENTS

| | | |
|---|---|---|
| 10,043,113 B1 | 8/2018 | Kim |
| 10,706,350 B1 | 7/2020 | Tran et al. |
| 2017/0372174 A1 | 12/2017 | Wshah et al. |

FOREIGN PATENT DOCUMENTS

| | | |
|---|---|---|
| CN | 107240066 | 10/2017 |
| CN | 109858461 | 6/2019 |
| EP | 3467721 | 4/2019 |

OTHER PUBLICATIONS

He, Junjun et al, "Dynamic multi-scale filters for semantic segmentation", 2019, In Proceedings of the IEEE/CVF international conference on computer vision, pp. 3562-3572 (Year: 2019).*

(Continued)

*Primary Examiner* — David F Dunphy
(74) *Attorney, Agent, or Firm* — Hanley, Flight & Zimmerman, LLC

(57) ABSTRACT

Techniques related to poly-scale kernel-wise convolutional neural network layers are discussed. A poly-scale kernel-wise convolutional neural network layer is applied to an input volume to generate an output volume and include filters each having a number of filter kernels with the same sample rate and differing dilation rates optionally in a repeating pattern of dilation rate groups within each of filters with the pattern of dilation rate groups offset between the filters the poly-scale kernel-wise convolutional neural network layer.

20 Claims, 10 Drawing Sheets

(56) References Cited

OTHER PUBLICATIONS

Zhang et al, "RAPNet: Residual Atrous Pyramid Network for Importance-Aware Street Scene Parsing", Mar. 10, 2020, IEEE Transactions on Image Processing, vol. 29, pp. 5010-5021 (Year: 2020).*

International Searching Authority, "International Preliminary Report on Patentability," issued in connection with International Patent Application No. PCT/CN2020/113760, mailed on Mar. 16, 2023, 6 pages.

International Search Report and Written Opinion for PCT Patent Application No. PCT/CN2020/113760, dated May 27, 2021.

Chen, Y., et al., "Drop an octave: Reducing spatial redundancy in convolutional neural networks with octave convolution", ICCV (2019).

Dai, J.F., et al., "Deformable Convolutional Networks", arXiv preprint arXiv:1703.06211; 2017.

Jaderberg, et al., "Spatial transformer networks", NIPS 2015.

Jeon, Y., et al., "Active convolution: Learning the shape of convolution for image classification", CVPR: 2017.

Lin, T.Y., et al., "Feature pyramid networks for object detection", CVPR: 2017.

Long, J., et al., "Fully Convolutional Networks for Semantic Segmentation", CVPR, Dec. 31, 2015.

Peng, J., et al., "Pod: Practical object detection with scale-sensitive network", ICCV; 2019.

Szegedy, C., et al., "Going deeper with convolutions", CVPR, 2015.

Tan, M., et al., "Mixconv: Mixed depthwise convolutional kernels", BMVC (2019).

Yu, F., et al., "Multi-scale context aggregation by dilated convolutions", ICLR (2016).

Zhao, H., et al., "Pyramid Scene Parsing Network", Computer Vision and Pattern Recognition (CVPR), 2017, pp. 2881-2890.

* cited by examiner

POLY-SCALE KERNEL-WISE CONVOLUTION FOR HIGH-PERFORMANCE VISUAL RECOGNITION APPLICATIONS

CLAIM OF PRIORITY

This Application is a National Stage Entry of, and claims priority to, PCT Application No. PCT/CN2020/113760, filed on 7 Sep. 2020 and titled "POLY-SCALE KERNAL-WISE CONVOLUTION FOR HIGH-PERFORMANCE VISUAL RECOGNITION APPLICATIONS" which is incorporated by reference in its entirety for all purposes.

BACKGROUND

Deep Convolutional Neural Networks (CNNs) are employed in a variety of Artificial Intelligence (AI) applications. However, modern streamlined CNN backbones are scale-sensitive as they usually have fixed-sized receptive fields, lacking the ability to gather diverse information from objects of various sizes and understand meaningful contextual backgrounds. Such design deficiencies restrict their performance on complex visual recognition tasks such as large-scale image classification, object detection, semantic segmentation, and others.

Currently, CNNs employ multi-scale feature fusion techniques to address scale-sensitivity issue of CNNs inclusive of application of dense skip connections between encode and decode layers and inception parallel layer branches. Other approaches include upgrading multi-scale feature fusion with more intricate skip connections between different layers or parallel layer branches. Furthermore, extra spatial transform parameters may be employed in some deep convolutional layers to increase network tolerance to spatial geometric transformations. Also, multiple sets of depth-wise convolutions with different kernel sizes can be used. However, such techniques have numerous disadvantages inclusive of increased parameters and computational budgets and limited application due to the need for entirely new CNN architectures.

There is an ongoing need for high quality and efficient convolutional models for AI and other image processing applications. It is with respect to these and other considerations that the present improvements have been needed. Such improvements may become critical as the implementation of CNN models in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
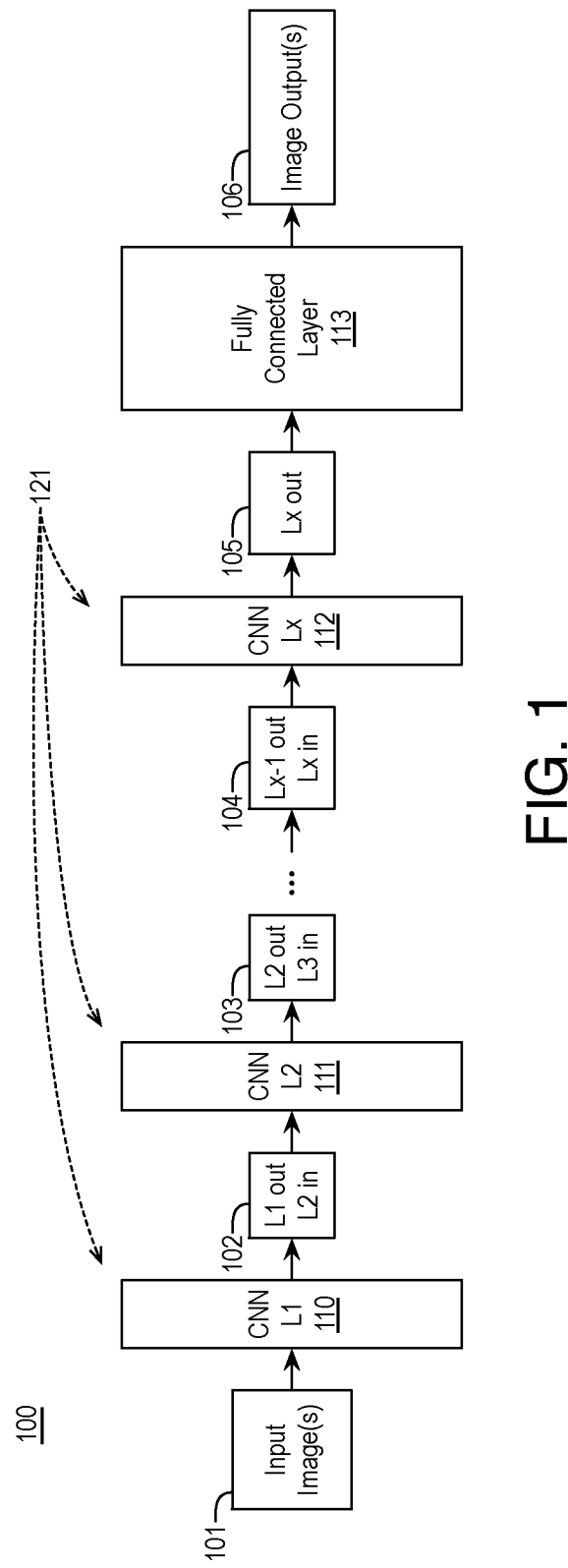
FIG. 1 illustrates an example convolutional neural network to provide image output(s) for input image(s)

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to poly-scale kernel-wise convolutional network layers such that the network layer includes a number of filters each having filter kernels of differing dilation rates.

As described above, it is desirable to improve the performance of convolutional neural network (CNN) layers. In particular, it is desirable to provide CNN layers that gather diverse information from an input image (e.g., via application to the input image or an input volume corresponding to the input image) for improved performance in complex visual recognition tasks. Notably, the poly-scale kernel-wise CNN layers discussed herein may be employed in any CNN architecture for improved performance. Such poly-scale kernel-wise CNN layers may be used in some or all layers of a CNN architecture or system. That is, poly-scale kernel-wise CNN layers may be used in combination with standard CNN layers in some CNN architectures.

In some embodiments, a poly-scale kernel-wise CNN layer is applied to an input volume to generate an output volume. The input volume includes a number of feature maps each at a particular resolution. An input volume may be an input image or an output volume from another CNN layer or an input volume generated from another source. The input volume may also be characterized as a tensor, an input tensor, or the like. The output volume also includes a number of feature maps (corresponding to the number of filters applied by the poly-scale kernel-wise CNN layer) at the same or a different resolution. The poly-scale kernel-wise CNN layer may include or may be followed by other layers such as pooling or ReLU layers as is known in the art. The resultant output volume is passed to another CNN layer, where it is characterized as an input volume for the next CNN layer. Such processing continues through a final CNN layer. The resultant output volume may be used as a final output of the CNN system and may include any number of image outputs corresponding to the input image. In some embodiments, the resultant output volume is provided to a fully connected layer that generates such image outputs. Such outputs may include any suitable characteristics or outputs at the pixel level, image level, or region level. For example, such outputs may include image classification labels, object detection labels, semantic segmentation labels. In other embodiments, the image outputs include pixel values of an enhanced, refined, or manipulated version of the input image such as an upscaled version of the input image, a refined version of the input image, a sharpened version of the input image, a de-hazed version of the input image, etc. The term image outputs is meant to include any such labels, pixel values, or the like that corresponds to the input image.

The poly-scale kernel-wise CNN layers discussed herein apply or convolve a number of filters with the input volume.

As discussed, the number of filters corresponds to the number of feature maps of the output volume. The filters may be employed in a full convolutional layer, a group convolutional layer, or a depth-wise convolutional layer as discussed further herein. Each filter of the poly-scale kernel-wise CNN layer has a number of filter kernels. For at least one filter of the poly-scale kernel-wise CNN layer, each filter kernel of the filter may have the same (matching) filter sample rate. As used herein, the term filter sample rate indicates the number of samples (e.g., pixels or feature map values) sampled or used by the filter kernel. For example, each filter kernel may sample nine pixels or feature map values (i.e., 3×3), twenty-five pixels or feature map values (i.e., 5×5), forty-nine pixels or feature map values (i.e., 7×7) or any suitable number and pattern of pixels or feature map values (i.e., 9×9, 11×11 or larger although such patterns are less used in CNNs). Furthermore, the filter kernels of the filter have varying dilation rates. As used herein, the term dilatation rate indicates the spatial size of the filter and, in particular, indicates the pixel count from a center sample that is used to find each next sample. For example, a dilation rate of one indicates the samples are immediately adjacent one another with no intervening pixels, a dilation rate of two indicates one pixel value (not used) is between each sampled pixel value (e.g., a step size of two is used), a dilation rate of three indicates two pixel values (not used) are between each sampled pixel value (e.g., a step size of three is used), and so on. By varying the dilatation rate, features of differing sizes are captured by the filter while the constant sample rate maintains low computational resource usage. As used herein, the term poly-scale kernel-wise indicates the kernels of a filter of CNN have different dilation rates while maintaining the same sampling rate.

As discussed, the output volume from the poly-scale kernel-wise CNN layer may be an input volume to another poly-scale kernel-wise CNN layer or any CNN layer in a particular CNN architecture and the ultimate results from the CNN architecture may provide an output or image characteristic in any suitable artificial intelligence, image processing, visual recognition, or other context. The poly-scale kernel-wise CNN layers discussed herein may be used in a plug and play manner in any deep CNN architecture or backbone such as ResNet, DenseNet, ResNeXt, SENet, ENAS and EfficientNet architectures for improved performance. Notably, a plug-and-play technique is provided, which is characterized as poly-scale kernel-wise convolution (PKConv) for improved robustness in any CNN architecture for scale variance in a broad range of visual recognition applications. Such techniques provide redesign at the CNN layer level rather than at the network architecture level for multi-scale feature fusion. Such performance boost is achieved without extra computational cost. Furthermore, large performance improvements may be employed in any visual recognition tasks and similar applications.

In some embodiments, regarding a single convolutional filter of the poly-scale kernel-wise CNN layer, the constituent filter kernels (or, simply, kernels) use a group of dilation rates to extract features corresponding to different receptive fields. Such groups of dilation rates may repeat in the single convolutional filter, for example. In addition, regarding all convolutional filters in the poly-scale kernel-wise CNN layer, the group of dilation rates corresponding to each convolutional filter may alternate along the axes of input and output channels in a cyclic fashion to extract diverse scale information from the incoming features and map them into outgoing feature maps in a wide range of scales. Through these atomic operations on individual 20 convolutional kernels, the scale-sensitive deficiency of modern CNN backbones is overcome to provide multi-scale feature fusion at a granular level.

FIG. 1 illustrates an example convolutional neural network 100 to provide image output(s) for input image(s), arranged in accordance with at least some implementations of the present disclosure. As shown in FIG. 1, convolutional neural network (CNN) 100 includes a first convolutional neural network layer (CNN L1) 110, a second CNN layer (CNN L2) 111, any number of intervening CNN layers, a final CNN layer (CNN Lx) 112, and an optional fully connected layer 113. Such layers are trained, in a network training phase to provide finalized parameters for deployment in a network implementation phase. CNN 100 may be implemented via any suitable device such as a personal computer, a laptop computer, a tablet, a phablet, a smart phone, a digital camera, a gaming console, a wearable device, a display device, an all-in-one device, a two-in-one device, or the like. For example, CNN 100 may provide at least a portion of an image artificial intelligence processing pipeline that may be implemented in hardware, software, or a combination thereof. In some embodiments, CNN 100 is implemented, in an implementation phase, in hardware as a system-on-a-chip (SoC). In some embodiments, the SoC is employed as a monolithic integrated circuit (IC). As used herein, the term monolithic indicates a device that is discrete from other devices, although it may be coupled to other devices for communication and power supply.

CNN 100 receives one or more input images 101 for processing or any other suitable input volume. For example, input image 101 may include a three-channel input including one channel for each color channel (e.g., RGB, YUV, etc.). However, input image 101 may include other feature maps such as one or more binary mask layers, motion vector layers, and so on depending on the visual recognition task being employed by CNN 100. Furthermore, input image 101 may correspond to a single time instance or multiple time instances. For example, video input images may be stacked and provided as an input volume for CNN 100.

As shown, CNN layer 110 processes input images 101 (i.e., an input volume or tensor) to provide a feature map volume or feature volume 102, which may be characterized as an output volume with respect to CNN layer 110 and an input volume with respect to CNN layer 111. Notably feature volume 102 includes any number of feature maps at any suitable resolution such that feature volume 102 corresponds to input images 101. CNN layer 110 applies any suitable convolutional layer discussed herein such as a poly-scale kernel-wise CNN layer 121. In some embodiments, each CNN layer 110, 111, 112 of CNN 100 employs a poly-scale kernel-wise CNN layer 121. In other embodiments, one or some of CNN layers 110, 111, 112 are poly-scale kernel-wise CNN layers 121 and others of CNN layers 110, 111, 112 are not poly-scale kernel-wise. That is, CNN 100 may employ any combination of poly-scale kernel-wise CNN layers 121 and CNN layers that are not poly-scale kernel-wise. Furthermore, each of CNN layers 110, 111, 112 may employ other layer processing such as pooling and ReLU. However, such operations are not shown for the sake of clarity of presentation.

Feature volume 102 is received by CNN layer 111, which generates feature map volume or feature volume 103, which may be characterized as an output volume with respect to CNN layer 111 and an input volume with respect to another CNN layer (not shown). Processing continues in a similar manner through a feature map volume or feature volume 104. Feature volume 104 is provided as an input volume to final CNN layer 112. CNN layer 112 receives feature volume 104 and generates a final output feature map volume or feature volume 105. In some embodiments, feature volume 105 is provided as an output from CNN 100. For example, feature volume 105 may be a single channel providing pixel-wise or region-wise semantic segmentation labels, pixel-wise or region-wise classification labels, or the like. In some embodiments, feature volume 105 is a three channel output with each channel representing a color channel such that feature volume 105 is an upscaled version of input image 101, a refined version of the input image 101, a sharpened version of input image 101, or a de-hazed version of input image 101, any of which may be characterized as an enhanced image. In other embodiments, as shown, feature volume 105 is provided to a fully connected layer 113, which generates image outputs 106. In such contexts, image outputs 106 may include a number of probabilities indicative of an object detected in input image 101, a most likely object label of an object detected in input image 101, or other characteristic detected in input image 101. Other uses of feature volume 105 are available and, in some embodiments, feature volume 105 and/or other image outputs 106 are provided to other AI or visual recognition applications.

As discussed, CNN 100 may employ any combination of poly-scale kernel-wise CNN layers and CNN layers that are not poly-scale kernel-wise. Discussion now turns to CNN layer(s) that are not poly-scale kernel-wise. For any CNN layer, the input volume (i.e., input image(s) 101 or feature volumes 102, 103, 104) may be characterized as an input volume or tensor, $\mathcal{F} \in \mathbb{R}^{C_{in} \times H \times W}$, having a size of $C_{in} \times H \times W$ such that Cin is the number of input channels and H and W are the height and width respectively. An exemplary input volume is illustrated herein with respect to FIG. 2, below. The applicable CNN layer applies or convolves a set of Cout filters each with a number of filter kernels each having a kernel size of K×K such that each filter has a number of filter kernels, Cin, matching the number of input channels (or feature maps) in the input volume. The discussed filters may be characterized as $\mathcal{G} \in \mathbb{R}^{C_{out} \times C_{in} \times H \times W}$ and the output volume from the convolution may be characterized as $\mathcal{H} \in \mathbb{R}^{C_{out} \times H \times W}$. In such contexts, the resultant output volume for a particular CNN layer is generated as shown in Equations (1):

$$\mathcal{H}_{c,x,y} = \sum_{k=1}^{C_{in}} \sum_{i=-\frac{K-1}{2}}^{\frac{K-1}{2}} \sum_{j=-\frac{K-1}{2}}^{\frac{K-1}{2}} \mathcal{G}_{c,k,i,j} \mathcal{F}_{k,x+i,y+j} \quad (1)$$

$$\mathcal{F} \in \mathbb{R}^{C_{in} \times H \times W}$$

$$\mathcal{G} \in \mathbb{R}^{C_{out} \times C_{in} \times H \times W}$$

$$\mathcal{H} \in \mathbb{R}^{C_{out} \times H \times W}$$

where $\mathcal{H}_{c,x,y}$ is one element (or value) in the output feature map $\mathcal{H} \in \mathbb{R}^{C_{out} \times H \times W}$, c=1, 2, Cout is an index of the output channels (or filters of the convolutional layer), and x=1, 2, . . . , H and y=1, 2, . . . , W are indices of spatial positions in the feature map.

In the context of Equations (1), the CNN layer does not apply dilation and each filter kernel samples immediately adjacent pixels or values of the corresponding feature map. In other embodiments, one or more CNN layers of CNN 100 that are not poly-scale kernel-wise may employ constant dilation based sampling. Such dilated convolution is shown with respect to Equation (2)

$$\mathcal{H}_{c,x,y} = \sum_{k=1}^{C_{in}} \sum_{i=-\frac{K-1}{2}}^{\frac{K-1}{2}} \sum_{j=-\frac{K-1}{2}}^{\frac{K-1}{2}} \mathcal{G}_{c,k,i,j} \mathcal{F}_{k,x+id,y+jd} \qquad (2)$$

where $\mathcal{H}_{c,x,y}$ is again one element (or value) in the output feature map $\mathcal{H} \in \mathbb{R}^{C_{out} \times H \times W}$ the $\mathbb{R}$ counting indices are employed as in Equations (1), and d provides a fixed dilation rate that provides a sampling offset that enlarges the receptive field of the convolution operations.

Comparison with Equations (1) shows that when d=1, a non-dilated convolutional layer is provided such that all samples or values are immediately adjacent one another. However, when d=2, a skip is provided such that a single (unused) value is between each sampled value, when d=3, a larger skip is provided such that two (unused) values are between each sampled value, and so on. Such filter kernel sampling patterns are illustrated herein below with respect to FIG. 3. Furthermore, it is noted that, for each filter kernel, the center value is also employed in the filter sampling pattern (i.e., when i=j=0).

Discussion now turns to implementation of poly-scale kernel-wise CNN layers 121. As discussed, one, some or all CNN layers of CNN 100 may employ poly-scale kernel-wise CNN layers 121.

Figure 2:
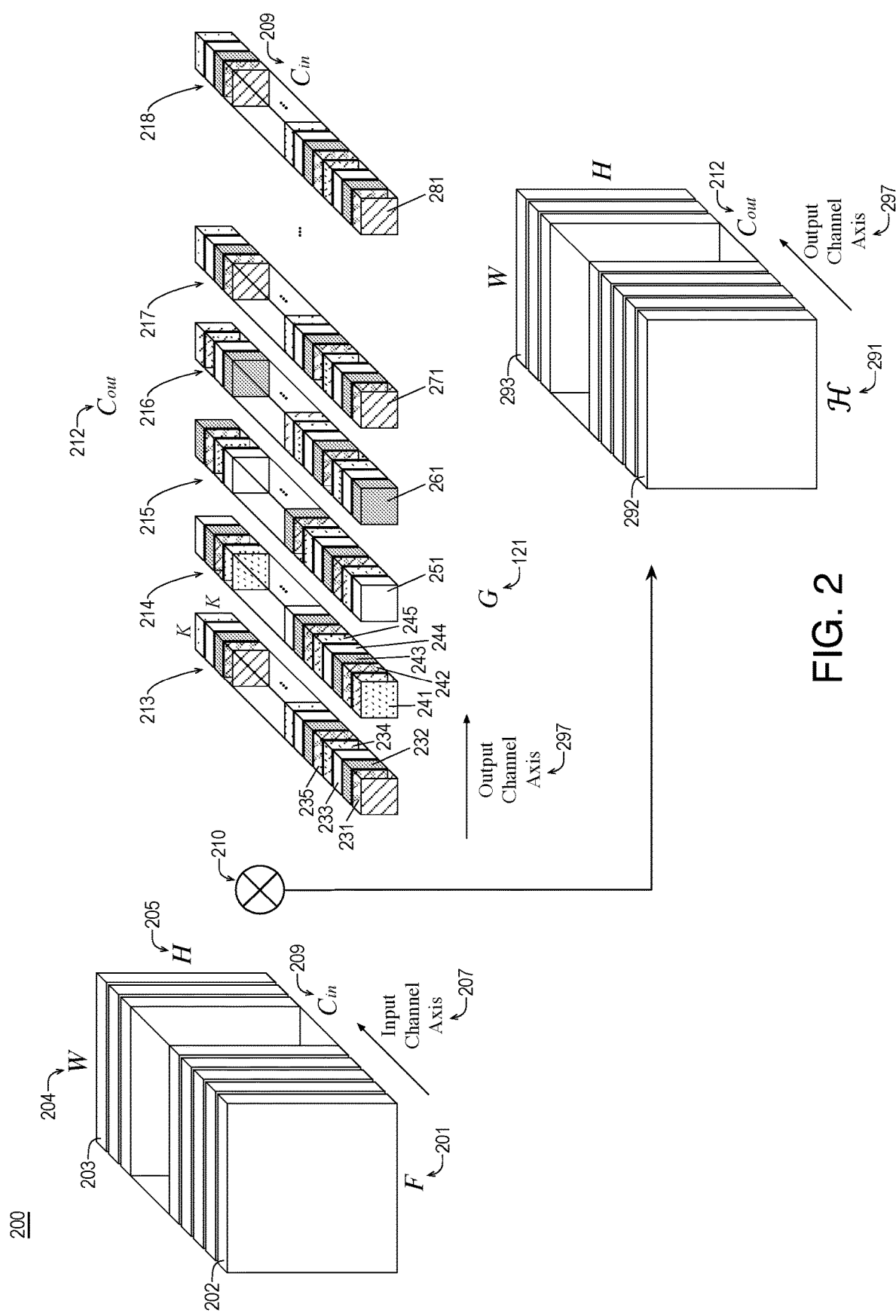
FIG. 2 illustrates exemplary convolution of an input volume with a poly-scale kernel-wise CNN layer to generate an output volume.

FIG. 2 illustrates exemplary convolution 200 of an input volume 201 with a poly-scale kernel-wise CNN layer 121 to generate an output volume 291, arranged in accordance with at least some implementations of the present disclosure. Input volume 201 may be any of input image(s) 101, feature volumes 102, 103, 104, or any other input volume, input feature maps, or tensor discussed herein. That is, input volume 201 may correspond to an input image in that input volume 201 includes the input image or was generated from the input image. Poly-scale kernel-wise CNN layer 121 may be employed as part of CNN 100 or any CNN discussed herein. Finally, output volume 291 may be any of feature volumes 102, 103, 104, 105 or any other output volume, output feature maps, or tensor discussed herein.

As shown in FIG. 2 and as discussed above, input volume 201, F, has any number of feature maps or input channels 209, Cin, (including feature maps 202, 203) each having a width 204, W, and a height 205, H. Each feature map includes a number of pixels, values, feature values or the like. Therefore, input volume 201 has a size or number of samples of Cin×H×W. Furthermore, in the context of input volume 201, feature map 202 may be characterized as a first or lead feature map and feature map 203 may be characterized as a final or last feature map. Intervening feature maps (not labeled) are in a predefined order along an input channel axis 207 that runs orthogonal to the height 205 and width 204 of input volume 201. That is, the feature maps, including feature map 202, 203, of input volume 201 are in a predefined order defined by the architecture of convolution 200 and the pretraining thereof. The predefined order is along input channel axis 207 and filter kernels of the filters of poly-scale kernel-wise CNN layer 121 are in kernel order along input channel axis 207, as discussed further below.

Via convolution operation 210, input volume 201 is convolved with poly-scale kernel-wise CNN layer 121, G, which is defined by filters 213, 214, 215, 216, 217, 218 and intervening filters (not shown), to generate output volume 291, H. Output volume 291 has any number of feature maps 292, 293 or output channels 212, Cout, matching the number of filters employed by poly-scale kernel-wise CNN layer 121. Each feature map has any suitable width 204, W, and height 205, H, based on the filter characteristics, any pooling or ReLU operations, etc. Notably, the width and height of input volume 201 and output volume 291 may or may not match.

Each of filters 213, 214, 215, 216, 217, 218 employs a number of filter kernels matching the number of input channels 209. For example, CNN layer filter 213 employs filter kernels 231, 232, 233, 234, 235, and so on, CNN layer filter 214 employs filter kernels 241, 242, 243, 244, 245, and so on, CNN layer filter 215 employs filter kernels 251, and so on, CNN layer filter 216 employs filter kernels 261, and so on, CNN layer filter 217 employs filter kernels 271, and so on, and CNN layer filter 218 employs filter kernels 281, and so on. Not all filter kernels are labeled for the sake of clarity of presentation and, in particular, with respect to CNN layers filter 215, 216, 217, 218, only lead filter kernels are labeled. In some embodiments, each filter kernel of a particular filter has a same sample rate (e.g., indicating the number of samples used by each filter kernel). In some embodiments, each filter kernel of poly-scale kernel-wise CNN layer 121 has a same and constant sample rate. The filter kernel sample rate may be any suitable sample rate such as nine samples, twenty-five samples, forty-nine samples, etc.

In FIG. 2 and elsewhere herein, the dilation rate of a filter kernel is illustrated via the shading or pattern used in the illustration. For example, filter kernels 231, 235, 242, 271, 281 have the same dilation rate (as illustrated by both having hatching), filter kernels 232, 243, 261 have the same dilation rate (as illustrated by both having gray shading), filter kernels 233, 244, 251, have the same dilation rate (as illustrated by both having neither shading nor patterning), filter kernels 234, 245 have the same dilation rate (as illustrated by both having a dotted pattern), and so on.

As shown, the filter kernels of each filter are ordered in a kernel order or the like that is also aligned with input channel axis 207. That is, filter kernels 231, 241, 251, 261, 271, 281 are applied to feature map 202, filter kernels 232, 242, etc. are applied to the feature map following feature map 202, and so on. Such patterns are again defined by the CNN layer architecture and pre-training of poly-scale kernel-wise CNN layer 121. Furthermore, filters 213, 214, 215, 216, 217, 218 are aligned along an output channel axis 297 such that filters 213, 214, 215, 216, 217, 218 and their constituent filter kernels are applied in the same manner with respect to input volume 201 to generate output volume 291. That is, filter 213 generates first or lead feature map 292, filter 214 generates a feature map (not labeled) following lead feature map 292, and so on, through filter 218 generate final or last feature map 293 of output volume 291. Therefore, the filters and their constituent filter kernels are applied with a particular geometry with respect to input volume 201 and output volume 291.

With respect to filters 213, 214, 215, 216, 217, 218, the dilation rates of the constituent filter kernels are varied in a repeating or cyclic fashion along input channel axis 207 such that the filter kernels of each of filters 213, 214, 215, 216, 217, 218 are in a kernel order along input channel axis 207. In the illustrated example, filter 213 has filter kernels 231, 232, 233, 234, 235 and so on such that lead filter kernel 231 has a first dilation rate, filter kernel 232 has a second dilation rate, filter kernel 233 has a third dilation rate, filter kernel 234 has a fourth dilation rate, filter kernel 235 has the first dilation rate, the filter kernel after filter kernel 232 has the second dilation rate, and so on such that a cyclic pattern is provided. In the illustrated example, four dilation rates are employed in a cyclic manner such that each cycle (i.e., first, second, third, and fourth dilation rates) are repeated without any intervening dilation rates. For example, sample rates of $d_1=1$, $d_2=2$, $d_3=3$, and $d_4=4$ may be cycled. In some embodiments, three dilation rates are cycled (e.g., $d_1=1$, $d_2=2$, $d_3=3$,). In other embodiments, a cyclic pattern inclusive of repeated dilation rates are employed. For example, a cycle pattern of $d=1$, $d_2=2$, $d_3=1$, and $d_4=4$ may be used.

For example, for each of filters 213, 214, 215, 216, 217, 218 a kernel order along input channel axis 207 includes a repeating pattern of a group of dilation rates. In the illustrated example, the group of dilation rates includes four dilation rates. However, the repeating groups may include any number of dilation rates such as two, three, four, or more dilation rates. In some embodiments, the repeating groups include eight dilation rates. Furthermore, each group of dilation rates may include a group of unique dilation rates (e.g., all dilation rates within a group are different), as illustrated, or one or more dilation rates within a group may repeat. Examples of four dilation rate group patterns include: $d_1=1$, $d_2=2$, $d_3=1$, $d_4=1$; $d_1=1$, $d_2=4$, $d_3=1$, $d_4=1$; and $d_1=1$, $d_2=2$, $d_3=1$, and $d_4=4$. Examples of two dilation rate group patterns include: $d_1=1$, $d_2=2$; $d_1=1$, $d_2=3$; and $d_1=1$, $d_2=4$. Other patterns are available.

Furthermore, as shown across filters 213, 214, 215, 216, 217, 218, a shift is employed with respect to the dilation rates. In the illustrated embodiment, a matching cyclic pattern of dilation rates for filter kernels is used within each of filters 213, 214, 215, 216, 217, 218 but the start of the pattern is shifted such that lead filter kernel 241 has a different dilation rate with respect to lead filter kernel 231, lead filter kernel 251 has a different dilation rate with respect to lead filter kernel 241, lead filter kernel 261 has a different dilation rate with respect to lead filter kernel 251, lead filter kernel 271 has a different dilation rate with respect to lead filter kernel 261 such that lead filter kernel 271 has a matching dilation rate with respect to lead filter kernel 231, and so on. Notably, lead filter kernel 241 has a dilation rate that matches the dilation rate of a last filter kernel of filter 213 (not labeled), lead filter kernel 251 has a dilation rate that matches the dilation rate of a last filter kernel of filter 214 (not labeled), and so on. Although illustrated with respect to each next filter having a lead filter kernel that matches a final filter kernel of the previous filter, any suitable shift may be used. In some embodiments, each next filter has a lead filter kernel that matches a second filter kernel of the previous filter.

Such cyclic patterning of filter kernel dilation rates within filters 213, 214, 215, 216, 217, 218 (i.e., along input channel axis 207) and shift patterning across filters 213, 214, 215, 216, 217, 218 (i.e., along output channel axis 297) provides improved performance and feature extraction.

Figure 3:
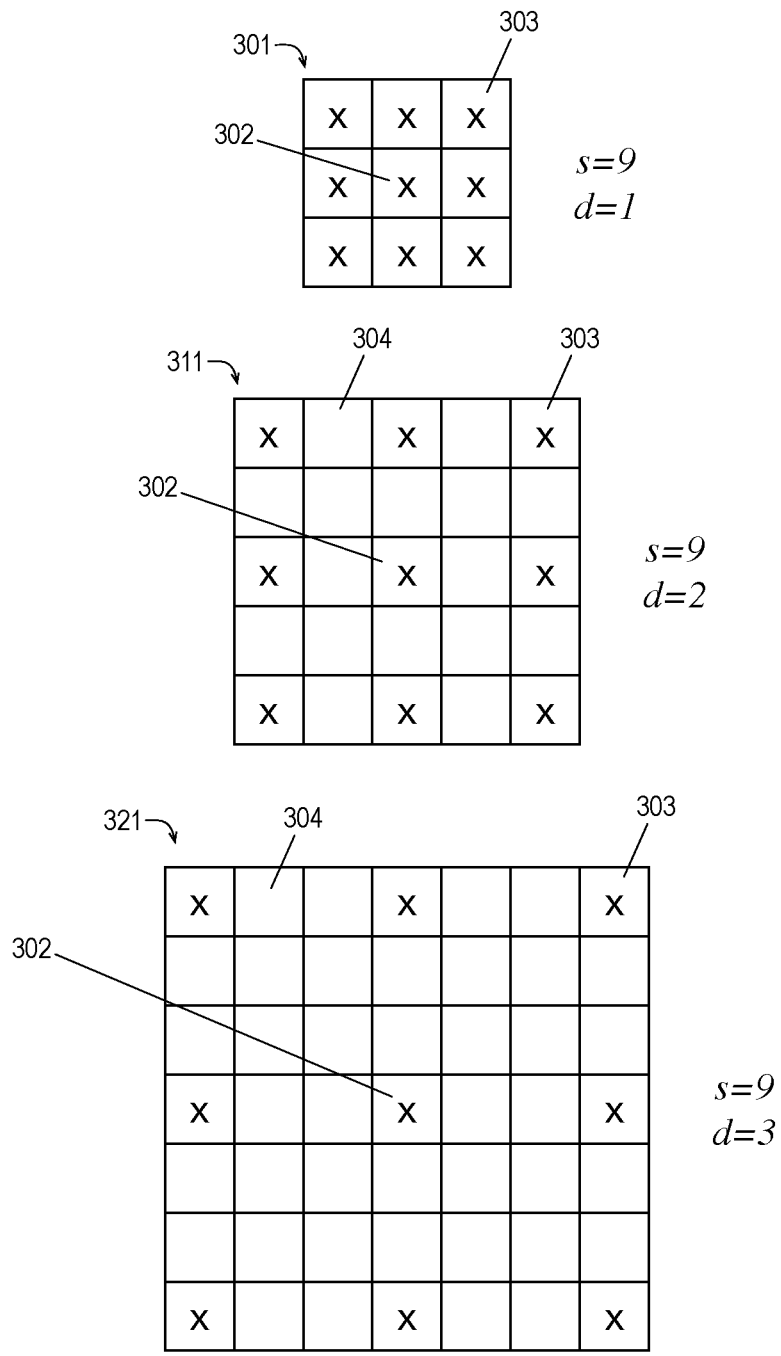
FIG. 3 illustrates exemplary filter kernel sampling patterns for use in a poly-scale kernel-wise CNN layer.

FIG. 3 illustrates exemplary filter kernel sampling patterns 301, 311, 321 for use in poly-scale kernel-wise CNN layer 121, arranged in accordance with at least some implementations of the present disclosure. In FIG. 3, a sampled location is illustrated with an x in a tile while an un-sampled location is illustrated with a blank tile. Notably a filter kernel having one of kernel sampling patterns 301, 311, 321 may be applied to a location of an input feature map and the resultant value for an output feature map is a weighted sum of feature map values and pre-trained filter kernel coefficients for each of the sample locations (and excluding the un-sampled locations). Although illustrated with respect to square filter patterns, other patterns such as diamond patterns may be used. Furthermore, asymmetric patterns may be employed in poly-scale kernel-wise CNN layer 121.

As shown, for filter kernel sampling pattern 301, a sampling rate of nine (e.g., s=9) and a dilation rate of one (e.g., d=1) are used. The resulting filter kernel sampling pattern 301 samples input feature map values at a center location 302 and eight other sampling locations 303 surrounding and immediately adjacent center location 302. Notably, a dilation rate of one provides for each of sampling locations 303 to be one location or pixel away from the previous sampling location moving away from center location 302. For filter kernel sampling pattern 311, a sampling rate of nine (e.g., s=9) and a dilation rate of two (e.g., d=2) are used. The resulting filter kernel sampling pattern 311 samples input feature map values at center location 302 and eight other sampling locations 303 surrounding center location 302 and removed from center location by one intervening un-sampled location 304. Notably, a dilation rate of two provides for each of sampling locations 303 to be two locations or pixels away from the previous sampling location moving away from center location 302. Finally, for filter kernel sampling pattern 321, a sampling rate of nine (e.g., s=9) and a dilation rate of three (e.g., d=3) are used. Notably, a dilation rate of three provides for each of sampling locations 303 to be three locations or pixels away from the previous sampling location moving away from center location 302. Furthermore, for filter kernel sampling pattern having a sampling rate of nine (e.g., s=9) and a dilation rate of four (e.g., d=4) (not shown), the resulting filter kernel sampling pattern samples input feature map values at a center location and eight other sampling locations surrounding center location 302 and removed from center location by three intervening un-sampled locations, and so on.

Such filter kernel sampling patterns may be extended to other sampling rates and/or dilation patterns for employment in poly-scale kernel-wise CNN layer 121 as is known in the art.

Returning to FIG. 2, as discussed, poly-scale kernel-wise CNN layer 121 (e.g., a PKConv layer) may employ one or both of the following design rules. First, regarding each single convolutional filter (e.g., each of filters 213, 214, 215, 216, 217, 218), its constituent kernels (e.g., filter kernels) uses a repeating pattern of a group of dilation rates to extract features in input volume 201 corresponding to different receptive fields or receptive field sizes. Such single convolutional filter dilation rate variation may employ a cyclic pattern of dilation rates, for example. Secondly, regarding all convolutional filters in one single layer (e.g., all of filters 213, 214, 215, 216, 217, 218 in poly-scale kernel-wise CNN layer 121), the group of dilation rates corresponding to each convolutional filter alternate along the axes of input and output channels (e.g., input channel axis 207 and output channel axis 297) in a cyclic fashion to extract diverse scale information from the incoming features and map them to outgoing features in a wide range of scales. Such atomic operations or architecture features for individual convolutional kernels, provide a multi-scale feature fusion at a granular level for improved CNN layer performance. Notably, each of the filters of poly-scale kernel-wise CNN layer 121 may include a repeating cyclic dilation rate pattern and adjacent ones of the filters may include the repeating cyclic dilation rate pattern shifted with respect to one another as illustrated in FIG. 2.

Continuing the notation discussed with respect to Equations (1) and (2), in some embodiments, the application of poly-scale kernel-wise CNN layer 121 is defined as shown in Equation (3)

$$\mathcal{H}_{c,x,y} = \sum_{k=1}^{C_{in}} \sum_{i=-\frac{K-1}{2}}^{\frac{K-1}{2}} \sum_{j=-\frac{K-1}{2}}^{\frac{K-1}{2}} \mathcal{G}_{c,k,i,j} \mathcal{F}_{k,x+iD(c,k),y+jD(c,k)} \quad (3)$$

$$D \in \mathbb{R}^{C_{out} \times C_{in}}$$

where $\mathcal{H}_{c,x,y}$ is one element (or value) in the output feature map $\mathcal{H} \in \mathbb{R}^{C_{out} \times H \times W}$, the counting indices are employed as in Equations (1), and D is a matrix composed of channel-wise and filter-wise dilation rates in two orthogonal dimensions: the input channel space (e.g., along input channel axis 207) and the output channel space (e.g., along output channel axis 297). That is, D defines the dilation rates of the filter kernels of filters 213, 214, 215, 216, 217, 218 as discussed with respect to FIG. 2. For example, an element $D_{(c,k)}$ is associated with a specific channel in one $\mathcal{G}$ filter to support $\mathcal{G}_{c,k,\cdot,\cdot}$ as a unique convolutional kernel, thus the whole matrix D can be interpreted as a representation of a kernel lattice, as discussed herein below, in its subspace of dilation rate. In accordance with Equation (3), poly-scale kernel-wise CNN layer 121 (e.g., a PKConv layer) integrates multi-scale features in a one-shot manner and brings characteristics of dilated convolution into play without introducing additional computational cost.

Figure 4:
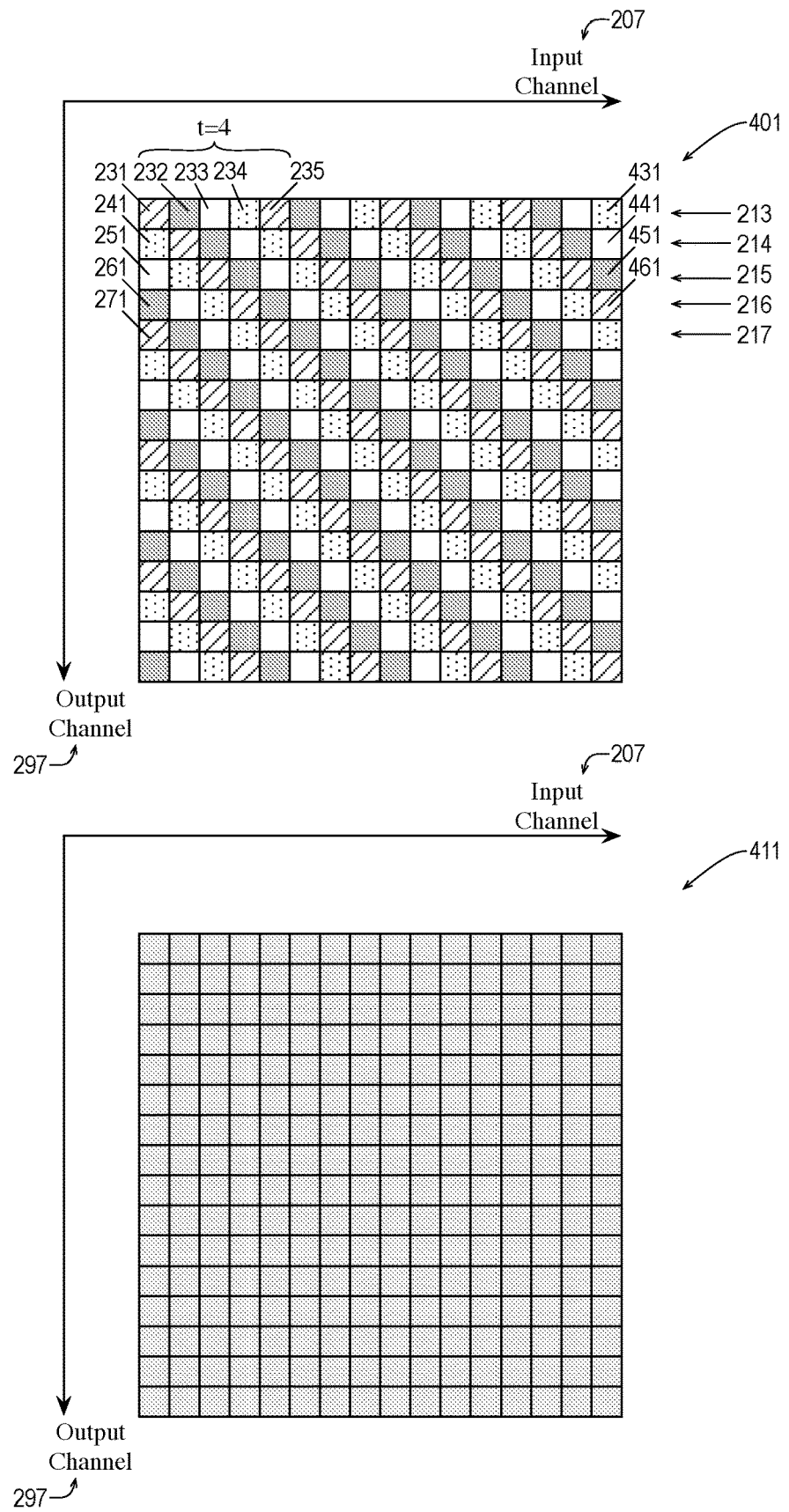
FIG. 4 illustrates a poly-scale kernel-wise CNN layer kernel lattice and a mono-scale CNN layer kernel lattice.

FIG. 4 illustrates a poly-scale kernel-wise CNN layer kernel lattice 401 and a mono-scale CNN layer kernel lattice 411, arranged in accordance with at least some implementations of the present disclosure. As shown in FIG. 4, poly-scale kernel-wise CNN layer kernel lattice 401 varies dilation rate in a cyclic pattern along input channel axis 207 for each of filters 213, 214, 215, 216, 217 as discussed with respect to FIG. 2. Furthermore, along output channel axis 297 and across filters 213, 214, 215, 216, 217 a shift is provided such that each of filters 213, 214, 215, 216, 217 begins with a filter kernel having a differing dilation rate. Furthermore, as shown, in some embodiments, lead filter kernel 241 of filter 214 has the same dilation rate as a final filter kernel 431 of filter 213, lead filter kernel 251 of filter 215 has the same dilation rate as a final filter kernel 441 of filter 214, lead filter kernel 261 of filter 216 has the same dilation rate as a final filter kernel 451 of filter 215, lead filter kernel 271 of filter 217 has the same dilation rate as a final filter kernel 461 of filter 216, and so on.

In contrast, mono-scale CNN layer kernel lattice 411 applies the same dilation rate (e.g., a dilation rate of one) for all filter kernels (as illustrated with respect to a light gray shading in each cell). As discussed, in some embodiments, poly-scale kernel-wise CNN layer kernel lattice 401 and mono-scale CNN layer kernel lattice 411 may be employed in the same CNN 100.

As used herein, the term kernel lattice, for a convolutional layer, indicates a two-dimensional flattened view of convolutional filters such that the kernel space is reduced while the channel space is retained and, thus, each cell in the lattice represents an individual filter kernel. In the context of FIG. 4, the discussed shading indicates the dilation rate of each of the individual kernels. As shown, in an embodiment, a cycle size of four partitions (e.g., t=4) is used such that a pattern of four dilation rates are repeated along input channel axis 207. However, any cycle size, such as cycle sizes of two, three, five, six, or more may be used. In some embodiments, the cycle size is two. In some embodiments, the cycle size is eight. In some embodiments, each dilation rate within a cycle is unique. In other embodiments, one or more of the dilation rates are repeated within a particular cycle.

As shown in FIG. 4, poly-scale kernel-wise CNN layer 121, in contrast to a mono-scale CNN layer, may reformulate dilation rate patterns in the subspace of a kernel lattice. Using the discussed design rules of cyclic patterns along filter kernels and shifts between filters, each column and row of kernel lattice 401 (and, therefore, matrix D) have non-identical elements to achieve the desired multi-scale feature fusion. In some embodiments, poly-scale kernel-wise CNN layer 121 includes a cyclic strategy and a shift strategy.

First, for an individual convolutional layer (e.g., poly-scale kernel-wise CNN layer 121), focus is directed to a single convolutional filter (e.g., any of filters 213, 214, 215, 216, 217, 218). To constrain the number of different dilation rates to a reasonable range, the dilation rates are heuristically arranged inside each filter in cyclic or repeating group manner (i.e., dilation rates vary in a periodical manner along input channel axis 207). Such periodic variation is shown with respect to filter 213 where the dilation rates of a group of four filter kernels 231, 232, 233, 234 are repeated through filter 218. Specifically, a total of Cin input channels 209 are divided into P partitions. For each partition, t=Cin/P, channels are accommodated and a fixed pattern of dilation rates $\{d_1, d_2, \ldots, d_t\}$ is filled in to construct each row of matrix D (e.g., with each row representative of one of filters 213, 214, 215, 216, 217, 218).

Second, across filters 213, 214, 215, 216, 217, 218 (i.e., along output channel axis 297), a shift strategy is employed to allow different filters to gather different kinds of scale combinations of input features. The shift strategy for dilation rates in the illustrated embodiment flips the former filter kernel to the latter filter kernel (i.e., the pattern of dilation rates regarding a convolutional filter are shifted by one channel to build an adjacent filter of an individual convolutional layer). In an embodiment, Cin=Cout=16 and the partition number, P, is set to four.

Therefore, there are four dilation rates, t=16/4, to be determined in a particular pattern $\{d_1, d_2, d_3, d_4\}$. As discussed, the pattern may include all unique dilation rates (e.g., dilation rates of 1, 2, 3, and 4). Such dilation rates may be in an ascending order (i.e., $\{d_1=1, d2=2, d_3=3, d_4=4\}$), a descending order (i.e., $\{d_1=4, d_2=3, d_3=2, d_4=1\}$), or other order such as $\{d_1=1, d_2=3, d_3=2, d_4=4\}$.

In other embodiments, the pattern includes one or more duplicated dilation rates. In an embodiment, the dilation rates are in the following order: $\{d_1=1, d_2=2, d_3=1, d_4=1\}$. In an embodiment, the dilation rates are in the following order: $\{d_1=1, d_2=4, d_3=1, d_4=1\}$. In an embodiment, the dilation rates are in the following order: $\{d_1=1, d2=2, d_3=1, d_4=2\}$. In a particularly advantageous embodiment, the dilation rates are in the following order: $\{d_1=1, d_2=2, d_3=1, d_4=4\}$. It is noted that along output channel axis 297, dilation rates also present periodical variation. That is, all types of dilation rates occur alternately along the vertical and horizontal axes in poly-scale kernel-wise CNN layer kernel lattice 401.

As discussed herein, poly-scale kernel-wise CNN layer 121 may be applied such that each filter thereof has a dimension along input channel axis 207 equal to that of input volume 201 (i.e., Cin). Such embodiments may be characterized as full convolution or the like. In other embodiments, poly-scale kernel-wise CNN layer 121 is applied as a group convolution or as a depth-wise convolution.

Figure 5:
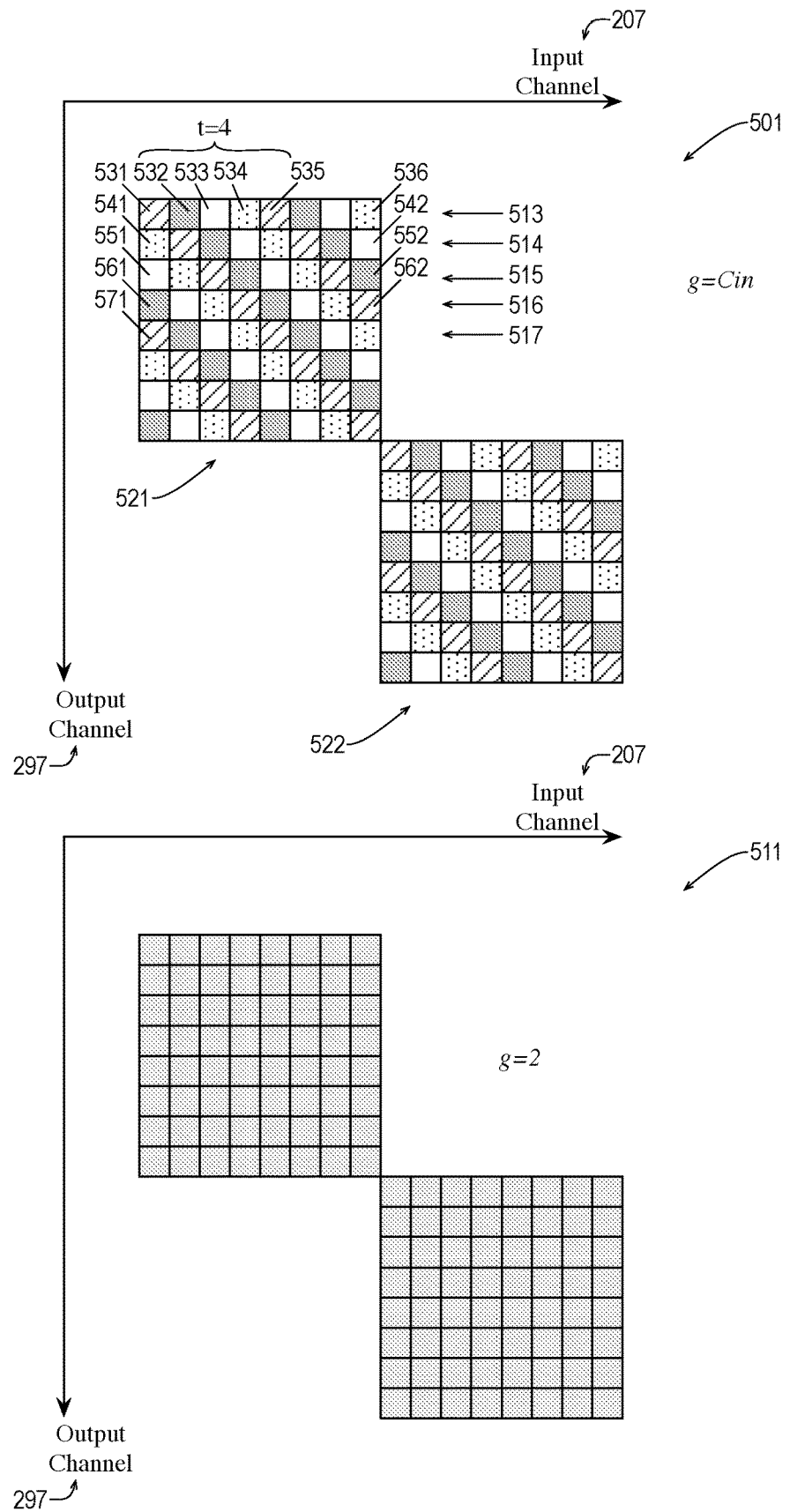
FIG. 5 illustrates a poly-scale kernel-wise CNN layer kernel lattice and a mono-scale CNN layer kernel lattice for a group convolutional layer.

FIG. 5 illustrates a poly-scale kernel-wise CNN layer kernel lattice 501 and a mono-scale CNN layer kernel lattice 511 for a group convolutional layer, arranged in accordance with at least some implementations of the present disclosure. Notably, group convolution layers split input volume 201 along input channel axis 207 (i.e., Cin) and apply filters having a size, along input channel axis 207, of the number of input feature maps divided by the number of groups (i.e., Cin/g) to each partition of input volume 201. The number of applied filters (and the number of output channels) is unchanged but the number of kernels of each filter is reduced. Such techniques can offer the advantage of different groups of filters performing, in combination, better learning in some contexts.

As shown, poly-scale kernel-wise CNN layer kernel lattice 501 again varies dilation rate in a cyclic or repeating pattern of dilation rate groups along input channel axis 207 for each of filters 513, 514, 515, 516, 517 of first group 521 as discussed with respect to FIG. 2 and as shown with respect to the dilation pattern of the group of filter kernels 531, 532, 533, 534 repeating with the group of filter kernels beginning with filter kernel 535. Furthermore, along output channel axis 297 and across filters 513, 514, 515, 516, 517 a shift is provided such that each of filters 513, 514, 515, 516, 517 begins with a filter kernel having differing dilation rates in a pattern. As shown, in some embodiments, lead filter kernel 541 of filter 514 has the same dilation rate as a final filter kernel 536 of filter 513, lead filter kernel 551 of filter 515 has the same dilation rate as a final filter kernel 542 of filter 514, lead filter kernel 561 of filter 516 has the same dilation rate as a final filter kernel 552 of filter 515, lead filter kernel 571 of filter 517 has the same dilation rate as a final filter kernel 562 of filter 516, and so on. In the example of FIG. 5, the same filter kernel pattern of first group 521 is repeated for a second group 522 filters.

As shown, poly-scale kernel-wise CNN layer kernel lattice 501 (and the corresponding poly-scale kernel-wise CNN layer 121), in contrast to a mono-scale CNN layer as illustrated with respect to CNN layer kernel lattice 511, provides varying dilation rate patterns for improved performance. As shown with respect to CNN layer kernel lattice 511 having all light gray tiles, each filter kernel employed by a corresponding CNN layer has the same, constant dilation rate. In the illustrated example, the poly-scale kernel-wise CNN layer corresponding to poly-scale kernel-wise CNN layer kernel lattice 501 divides the filters into two groups (i.e., g=2); however, the poly-scale kernel-wise CNN layer corresponding to poly-scale kernel-wise CNN layer kernel lattice 501 may divide the filters into any number of groups such as four or eight groups.

Furthermore, any dilation rate grouping patterns along input channel axis 207 (i.e., within each of the filters) and any shifting patterns across input channel axis 207 and along output channel axis 297 (i.e., between adjacent filters) discussed herein may be employed in poly-scale kernel-wise CNN layer kernel lattice 501 (and the corresponding poly-scale kernel-wise CNN layer 121).

Figure 6:
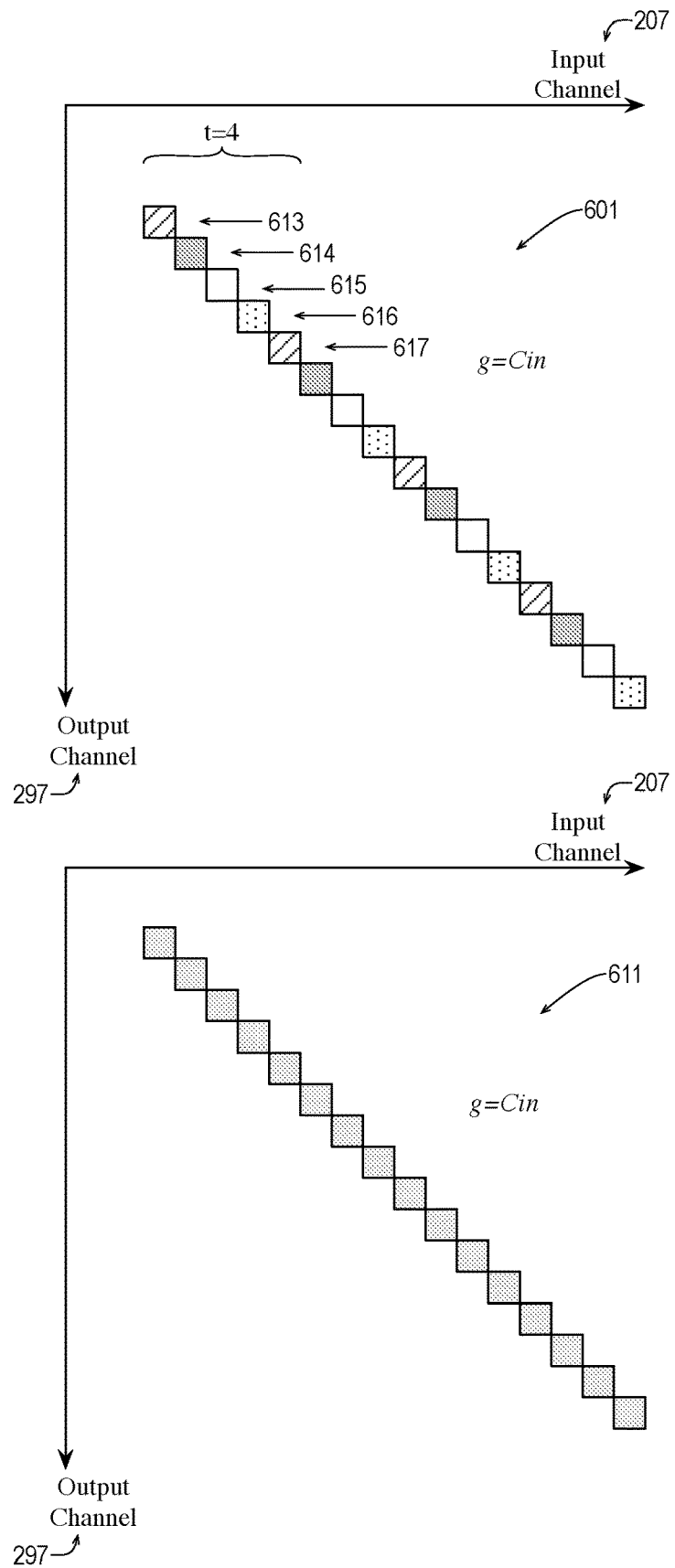
FIG. 6 illustrates a poly-scale kernel-wise CNN layer kernel lattice and a mono-scale CNN layer kernel lattice for a depth-wise convolutional layer.

FIG. 6 illustrates a poly-scale kernel-wise CNN layer kernel lattice 601 and a mono-scale CNN layer kernel lattice 611 for a depth-wise convolutional layer, arranged in accordance with at least some implementations of the present disclosure. Notably, depth-wise convolution layers, which may be considered the end case of group convolution layers splitting, split input volume 201 along input channel axis 207 (i.e., Cin) into a number of groups matching the number of feature maps (i.e., g=Cin). A depth-wise convolution layer then applies filters having depth of 1 along input channel axis 207 and a particular sample size (e.g., 1×3×3 filters). The number of applied filters (and the number of output channels) may be unchanged but the number of kernels of each filter is reduced to one such that each filter may be characterized as simply a filter or a filter kernel.

As shown, poly-scale kernel-wise CNN layer kernel lattice 601 varies dilation rate in a cyclic or repeating pattern of dilation rate groups along input channel axis 207 and output channel 297 simultaneously for each of filters 613, 614, 615, 616, 617 of the poly-scale kernel-wise CNN layer corresponding to poly-scale kernel-wise CNN layer kernel lattice 601. Notably, any dilation rate grouping sizes and patterns discussed herein may be employed in poly-scale kernel-wise CNN layer kernel lattice 601. In some embodiments, the dilation group rate pattern is a two dilation rate pattern of: $\{d_1=1, d2=2\}$ or $\{d_1=1, d2=4\}$. In some embodiments, the dilation group rate pattern is a four dilation rate pattern of: $\{d_1=1, d2=2, d_3=1, d_4=1\}$, $\{d_1=1, d_2=4, d_3=1, d_4=1\}$, or $\{d_1=1, d_2=2, d_3=1, d_4=4\}$. However, any size of group and dilation pattern within each group may be used.

As shown, poly-scale kernel-wise CNN layer kernel lattice 601 (and the corresponding poly-scale kernel-wise CNN layer 121), in contrast to a mono-scale CNN layer as illustrated with respect to CNN layer kernel lattice 611, provides varying dilation rate patterns. That is, for CNN layer kernel lattice each filter used by a corresponding CNN layer has the same, constant dilation rate while, as discussed a poly-scale kernel-wise CNN layer corresponding to poly-scale kernel-wise CNN layer kernel lattice 601 provides varying and patterned dilation rates for improved performance.

Figure 7:
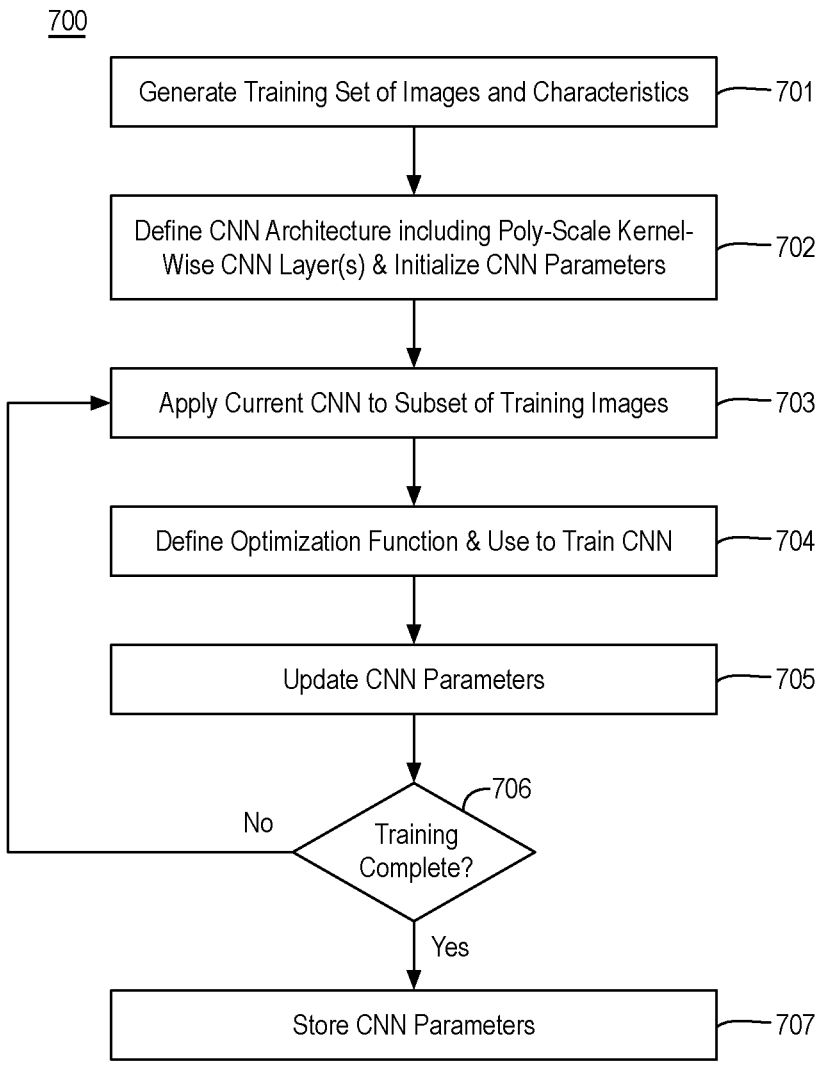
FIG. 7 is a flow diagram illustrating an example process for training a CNN including one or more poly-scale kernel-wise CNN layers.

FIG. 7 is a flow diagram illustrating an example process 700 for training a CNN including one or more poly-scale kernel-wise CNN layers, arranged in accordance with at least some implementations of the present disclosure. Process 700 may include one or more operations 701-707 as illustrated in FIG. 7. Process 700 or portions thereof may be performed by any device or system discussed herein to train a CNN such as CNN 100.

Process 700 begins at operation 701, where a training set of training images and corresponding image output information are generated. The training images and corresponding image output may be characterized as a training instance. As discussed, a CNN including one or more poly-scale kernel-wise CNN layers may be employed for any visual recognition application such as image classification, object detection, semantic segmentation, image enhancement including one of image upscaling, image sharpening, image refinement, and others. Notably, the image output information for each training image includes the corresponding desired image output of the application for which the CNN is being trained. The training image instances may include any number (e.g., thousands) of image instances (i.e., images and corresponding ground truth information).

Processing continues at operation 702, where, a CNN configuration (e.g., a network architecture or CNN backbone) is defined that includes one or more poly-scale kernel-wise CNN layers. The one or more poly-scale kernel-wise CNN layers may include any characteristics discussed herein. For example, any CNN discussed with respect to CNN 100 may be trained. Furthermore, the CNN is initialized with parameters such as filter coefficients for training. The network parameters may be initialized using any suitable technique or techniques such as randomization within particular ranges or the like.

Processing continues at operation 703, where the CNN (at a first or subsequent training iteration) is applied to at least a subset of training image instances. That is, the CNN, based on current network parameters is applied to sets of training images to generate image outputs that seek to replicate the ground truth image outputs for the training instances For example, at operation 703, for any number of image instances, the CNN is applied to each image and the resultant image output is attained for use in training the CNN.

Processing continues at operation 704, where a loss term, loss function, or other optimization function is defined and used to train the CNN via back-propagation techniques or the like to alter the parameters of the CNN to better attain the ground image outputs. The loss term or function may be based on any suitable training techniques such as a measure of distance (e.g., L2 distance) from the desired image output, entropy loss minimization, etc.

Processing continues at operation 705, where the CNN parameters are updated and refined based on the optimization performed at operation 704. Therefore, at a training iteration of the CNN, the CNN parameters are adjusted (or updated) based on optimization of a loss term, loss function, or other optimization function.

Processing continues at decision operation 706, where a determination is made as to whether training is complete. Such a determination may be made using any suitable technique or techniques. In some embodiments, training is complete when the loss function or optimization function defined at operation 704 has a loss or error less than a threshold. In some embodiments, training is complete after a predetermined number of training epochs is performed.

If training is not complete, processing continues at operation 703 as discussed above until training is complete. When training is complete, processing continues at operation 707, where the CNN parameters are stored to memory for eventual deployment in an implementation phase of the CNN.

Figure 8:
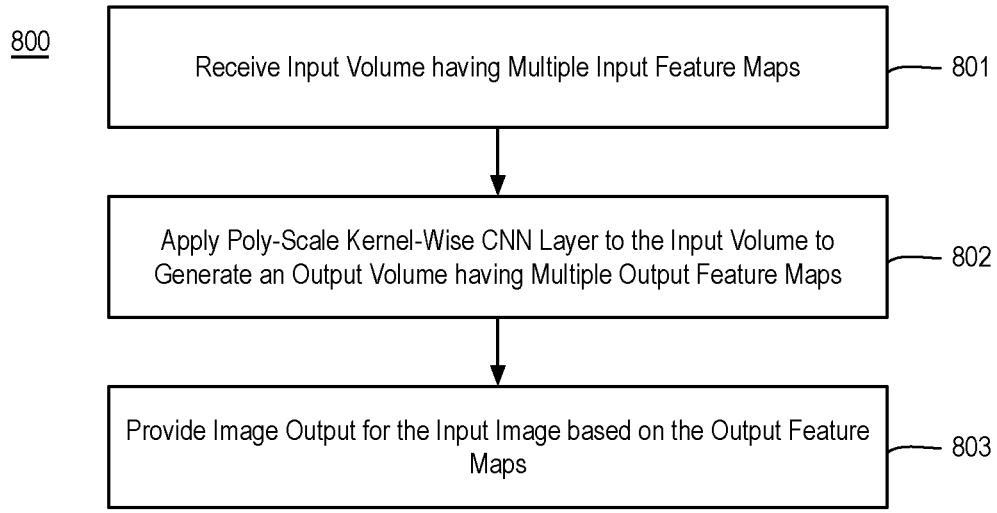
FIG. 8 is a flow diagram illustrating an example process 800 for applying a convolutional neural network (CNN)

FIG. 8 is a flow diagram illustrating an example process 800 for applying a convolutional neural network (CNN), arranged in accordance with at least some implementations of the present disclosure. Process 800 may include one or more operations 801-803 as illustrated in FIG. 8. Process 800 may form at least part of an artificial intelligence, visual recognition, or other application. By way of non-limiting example, process 800 may form at least part of image processing performed by CNN 100 in an implementation phase of CNN 100 (i.e., after a training phase as discussed with respect to FIG. 7). Furthermore, process 800 will be described herein with reference to system 900 of FIG. 9.

Figure 9:
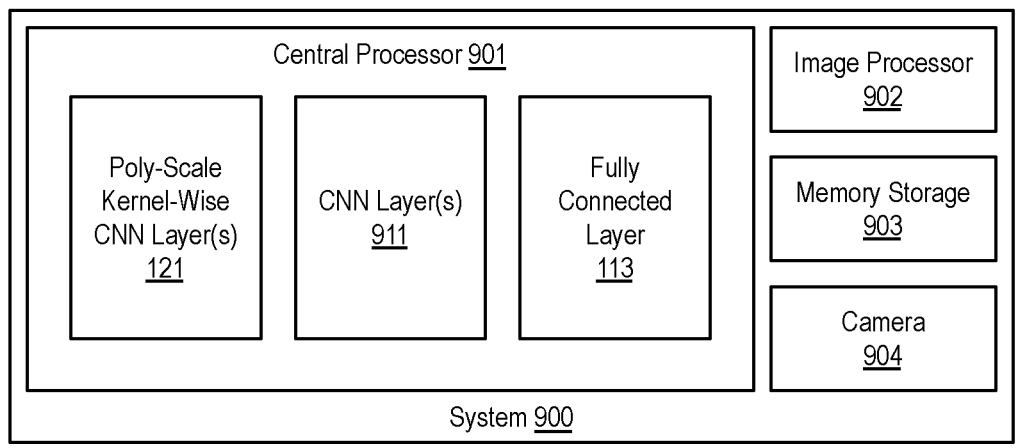
FIG. 9 is an illustrative diagram of an example system 900 for applying a convolutional neural network (CNN)

FIG. 9 is an illustrative diagram of an example system 900 for applying a convolutional neural network (CNN), arranged in accordance with at least some implementations of the present disclosure. As shown in FIG. 9, system 900 may include a central processor 901, an image processor 902, a memory storage 903, and a camera 904. For example, camera 904 may acquire input images for processing. Also as shown, central processor 901 may include or implement any number of poly-scale kernel-wise CNN layers 121, CNN layers 911 (i.e., CNN layers that are not poly-scale kernel-wise), and optional fully connected layer 113. System 900 may also include or implement any modules, layers, or components as discussed herein. Memory storage 903 may store input images, CNN parameters, input volumes, output volumes, image outputs, or any other data discussed herein.

As shown, in some examples, poly-scale kernel-wise CNN layers 121, CNN layers 911, and fully connected layer 113 are implemented via central processor 901. In other examples, one or more or portions of poly-scale kernel-wise CNN layers 121, CNN layers 911, and fully connected layer 113 are implemented via image processor 902, a video processor, a graphics processor, or the like. In yet other examples, one or more or portions of poly-scale kernel-wise CNN layers 121, CNN layers 911, and fully connected layer 113 are implemented via an image or video processing pipeline or unit.

Image processor 902 may include any number and type of graphics, image, or video processing units that may provide the operations as discussed herein. In some examples, image processor 902 is an image signal processor. For example, image processor 902 may include circuitry dedicated to manipulate image data obtained from memory storage 903. Central processor 901 may include any number and type of processing units or modules that may provide control and other high level functions for system 900 and/or provide any operations as discussed herein. Memory storage 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 903 may be implemented by cache memory.

In an embodiment, one or more or portions of poly-scale kernel-wise CNN layers 121, CNN layers 911, and fully connected layer 113 are implemented via an execution unit (EU) of image processor 902. The EU may include, for example, programmable logic or circuitry such as a logic core or cores that may provide a wide array of programmable logic functions. In an embodiment, one or more or portions of poly-scale kernel-wise CNN layers 121, CNN layers 911, and fully connected layer 113 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of poly-scale kernel-wise CNN layers 121, CNN layers 911, and fully connected layer 113 are implemented via an application specific integrated circuit (ASIC). The ASIC may include an integrated circuitry customized to perform the operations discussed herein. Camera 904 may include any camera having any suitable lens and image sensor and/or related hardware for capturing images or video for input to a CNN as discussed herein.

Returning to discussion of FIG. 8, process 800 begins at operation 801, where an input volume corresponding to an input image is received for processing such that the input volume includes a number of input feature maps. The input volume may include any number of feature maps and may correspond to an input to a CNN or an input to any layer of the CNN. In some embodiments, the input volume includes the input image. In some embodiments, the input volume is generated from the input image based on applying one or more prior CNN layers to a prior input volume including the input image or other image processing of the input image. The CNN implemented by process 800 may be for any suitable image processing or visual recognition task. In some embodiments, the CNN layer an image classification network, an object detection network, a semantic segmentation network, or an image enhancement network.

Processing continues at operation 802, where a CNN layer is applied to the input volume to generate an output volume including a number output feature maps such that the CNN layer includes a number filters each having a number of filter kernels such that a first filter of the filters includes a first set of filter kernels, and such that a first filter kernel of the first set of filter kernels has a first dilation rate and a second filter kernel of the first set of filter kernels has a second dilation rate (other than the first dilation rate) and the first and second filter kernels have a matching sample rate. The first and second dilation rates may be any suitable dilation rates such as any combination of dilation rates of one, two, three, and four.

In some embodiments, the input feature maps are in a predefined order along an axis of the input feature maps (i.e., orthogonal to a height and width plane of the feature maps) and the first set of filter kernels are in a kernel order along the axis such that the kernel order along the axis has a repeating pattern of a group of dilation rates including the first dilation rate and the second dilation rate. In some embodiments, the group of dilation rates includes the first dilation rate, followed by the second dilation rate, followed by the first dilation rate, followed by the first dilation rate. As used herein, the terms followed by or preceded by indicates no intervening dilation rates are between the discussed dilation rates. For example, a dilation rate of one followed by a dilation rate of two indicates no dilation rate is therebetween. For example, the first dilation rate may be one and the second dilation rate may be two, three, or four. In some embodiments, the first set of filter kernels further includes a third filter kernel having a third dilation rate and the group of dilation rates includes the first dilation rate, followed by the second dilation rate, followed by the first dilation rate, followed by the third dilation rate. In some embodiments, the first dilation rate is one, the second dilation rate is two and the third dilation rate is four. Such patterns of groups of dilation rates provides cyclic or repeating dilation rate patterns within a particular filter of the filters of the poly-scale kernel-wise CNN layer.

In some embodiments, a second filter of the filters adjacent to the first filter along an axis of the output feature maps includes a number of second filter kernels in the kernel order along the axis. In some embodiments, the second filter kernels are offset with respect to the filter kernels such that a first input feature map in the predefined order corresponds to the first dilation rate in the first filter and the second rate in the second filter. Such patterns of groups of dilation rates between particular filters of the filters of the poly-scale kernel-wise CNN layer provides a shift pattern of the group of dilation rates. In some embodiments, each of the filters of the poly-scale kernel-wise CNN layer includes a repeating cyclic dilation rate pattern and adjacent ones of the plurality of filters have the repeating cyclic dilation rate pattern shifted with respect to one another. In some embodiments, a second filter of filters of the poly-scale kernel-wise CNN layer immediately adjacent the first filter includes a lead filter kernel having a matching dilation rate to a final filter kernel of the first filter.

In some embodiments, each layer of the CNN architecture employed in process 800 is a poly-scale kernel-wise CNN layer. In other embodiments, one or more of the layers of the CNN architecture is a mono-scale CNN layer. In some embodiments, process 800 further includes applying a second CNN layer to the output volume to generate a second output volume such that the second CNN layer includes second filters each having a number of second filter kernels with each filter kernel of the second filter kernels having a constant filter sample rate and a constant dilation rate.

Processing continues at operation 803, where an image output corresponding to the input image is provided based on the plurality of output feature maps. In some embodiments, the image output is one or more of the output feature maps. In some embodiments, the image output is a set of output feature maps from another convolutional layer of the CNN. In some embodiments, the image output is generated based on application of a fully connected layer to the output feature maps or output feature maps from another convolutional layer of the CNN. The image output may correspond to any image processing task, visual recognition task, etc. In some embodiments, the CNN layer is one of a plurality of CNN layers of at least one of an image classification network, an object detection network, a semantic segmentation network, or an image enhancement network.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity. In some embodiments, a system includes a memory to store any data structure discussed herein and one or more processors to implement any operations discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein. In some embodiments, the operations discussed herein are implemented by at least one non-transitory machine readable medium including instructions that, in response to being executed on a device, cause the device to perform such operations.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
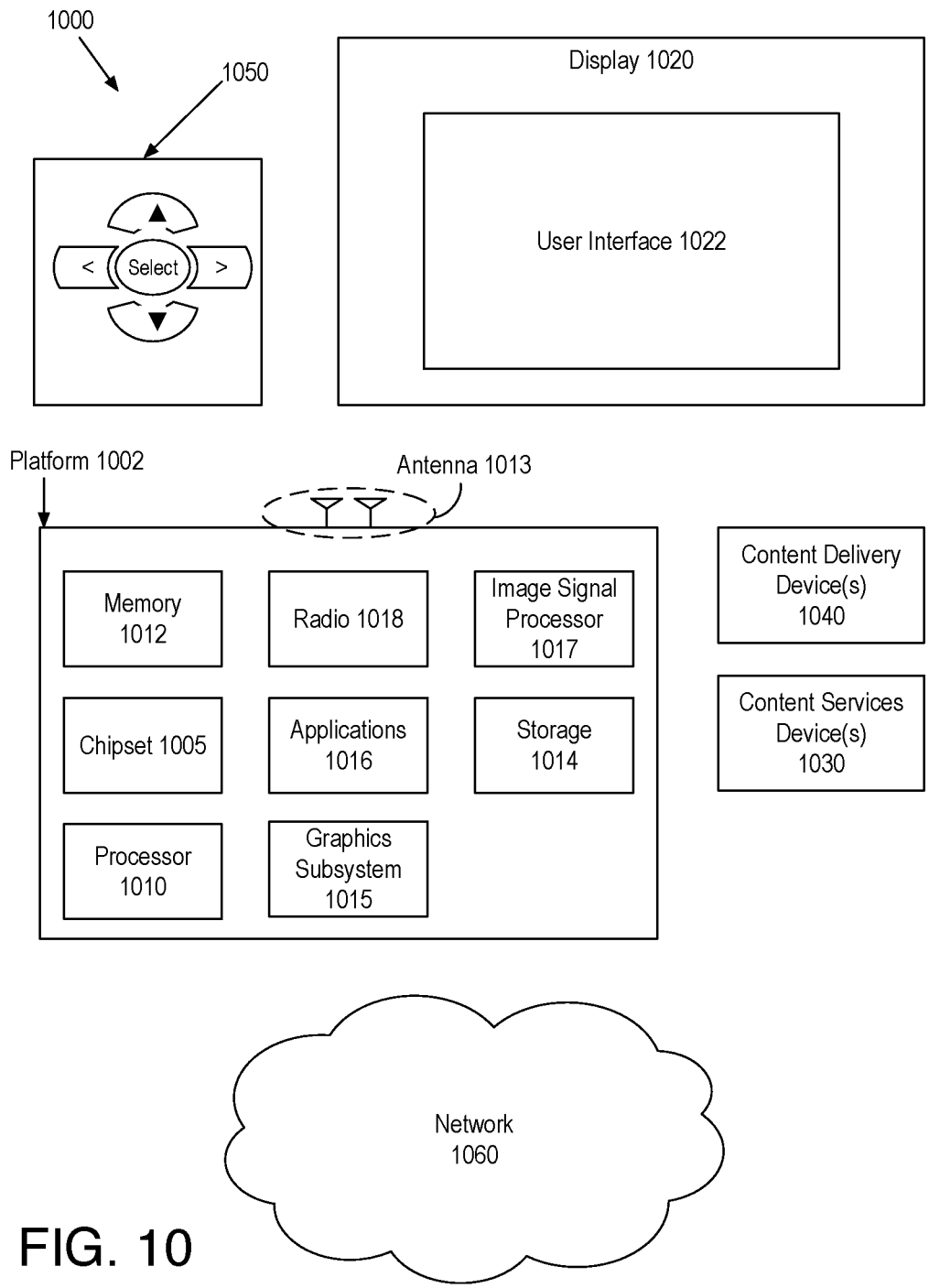
FIG. 10 is an illustrative diagram of an example system.

FIG. 10 is an illustrative diagram of an example system 1000, arranged in accordance with at least some implementations of the present disclosure. In various implementations, system 1000 may be a mobile system although system 1000 is not limited to this context. System 1000 may implement and/or perform any modules or techniques discussed herein. For example, system 1000 may be incorporated into a personal computer (PC), server, laptop computer, ultra-laptop computer, tablet, touch pad, portable computer, hand-held computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1000 may be implemented via a cloud computing environment.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image or video frame processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
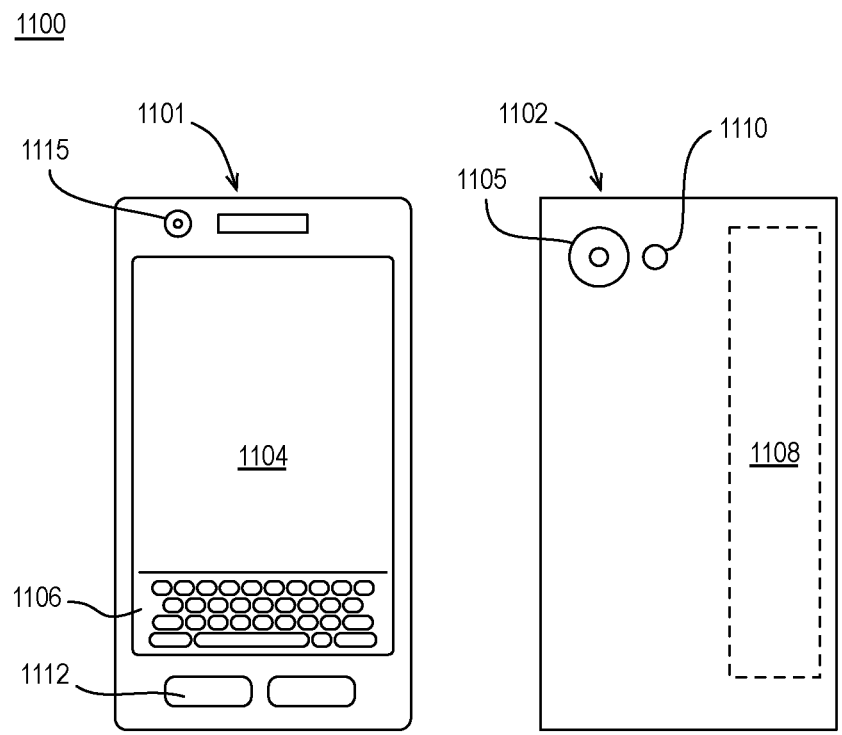
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other systems discussed herein or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, camera 1115, a camera 1105, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include camera 1105 and a flash 1110 integrated into back 1102 (or elsewhere) of device 1100 and camera 1115 integrated into front 1101 of device 1100. In some embodiments, either or both of cameras 1115, 1105 may be moveable with respect to display 1104. Camera 1115 and/or camera 1105 may be components of an imaging module or pipeline to originate color image data processed into streaming video that is output to display 1104 and/or communicated remotely from device 1100 via antenna 1108 for example. For example, camera 1115 may capture input images and eye contact corrected images may be provided to display 1104 and/or communicated remotely from device 1100 via antenna 1108.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for applying a convolutional neural network (CNN) comprises receiving an input volume corresponding to an input image, the input volume comprising a plurality of input feature maps, applying a CNN layer to the input volume to generate an output volume comprising a plurality of output feature maps, the CNN layer comprising a plurality of filters each comprising a plurality of filter kernels, wherein a first filter of the plurality of filters comprises a first plurality of filter kernels, wherein a first filter kernel of the first plurality of filter kernels has a first dilation rate and a second filter kernel of the first plurality of filter kernels has a second dilation rate and wherein the first and second filter kernels have a matching sample rate, and providing an image output corresponding to the input image based on the plurality of output feature maps.

In one or more second embodiments, further to the first embodiment, the input feature maps are in a predefined order along an axis of the input feature maps and the first plurality of filter kernels are in a kernel order along the axis, wherein the kernel order along the axis comprises a repeating pattern of a group of dilation rates comprising the first dilation rate and the second dilation rate.

In one or more third embodiments, further to the first or second embodiments, the group of dilation rates comprises the first dilation rate, followed by the second dilation rate, followed by the first dilation rate, followed by the first dilation rate.

In one or more fourth embodiments, further to any of the first through third embodiments, the first plurality of filter kernels comprises a third filter kernel having a third dilation rate and the group of dilation rates comprises the first dilation rate, followed by the second dilation rate, followed by the first dilation rate, followed by the third dilation rate.

In one or more fifth embodiments, further to any of the first through fourth embodiments, the first dilation rate is one, the second dilation rate is two and the third dilation rate is four.

In one or more sixth embodiments, further to any of the first through fifth embodiments, a second filter of the plurality of filters adjacent to the first filter along an axis of the output feature maps comprises a plurality of second filter kernels in the kernel order along the axis.

In one or more seventh embodiments, further to any of the first through sixth embodiments, the second filter kernels are offset with respect to the filter kernels such that a first input feature map in the predefined order corresponds to the first dilation rate in the first filter and the second rate in the second filter.

In one or more eighth embodiments, further to any of the first through seventh embodiments, each of the plurality of filters comprises a repeating cyclic dilation rate pattern and wherein adjacent ones of the plurality of filters comprise the repeating cyclic dilation rate pattern shifted with respect to one another.

In one or more ninth embodiments, further to any of the first through eighth embodiments, a second filter of the plurality of filters immediately adjacent the first filter of the plurality of filters comprises a lead filter kernel having a matching dilation rate to a final filter kernel of the first filter.

In one or more tenth embodiments, further to any of the first through ninth embodiments, the method further comprises applying a second CNN layer to the output volume to generate a second output volume, wherein the second CNN layer comprises a plurality of second filters each comprising a second plurality of filter kernels, wherein each filter kernel of the second plurality of filter kernels has a constant filter sample rate and a constant dilation rate.

In one or more eleventh embodiments, further to any of the first through tenth embodiments, the CNN layer is one of a plurality of CNN layers of at least one of an image classification network, an object detection network, a semantic segmentation network, or an image enhancement network.

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system, comprising:
   a memory to store at least a portion of an input volume corresponding to an input image, the input volume comprising a plurality of input feature maps; and
   one or more processors coupled to the memory, the one or more processors to:
   apply a convolutional neural network (CNN) layer to the input volume to generate an output volume comprising a plurality of output feature maps, the CNN layer comprising a plurality of filters each comprising a plurality of filter kernels, wherein a first filter of the plurality of filters comprises a first plurality of filter kernels, wherein a first filter kernel of the first plurality of filter kernels has a first dilation rate and a second filter kernel of the first plurality of filter kernels has a second dilation rate and wherein the first and second filter kernels have a matching sample rate; and
   provide an image output corresponding to the input image based on the plurality of output feature maps.

2. The system of claim 1, wherein the input feature maps are in a predefined order along an axis of the input feature maps and the first plurality of filter kernels are in a kernel order along the axis, wherein the kernel order along the axis comprises a repeating pattern of a group of dilation rates comprising the first dilation rate and the second dilation rate.

3. The system of claim 2, wherein the group of dilation rates comprises the first dilation rate, followed by the second dilation rate, followed by the first dilation rate, followed by the first dilation rate.

4. The system of claim 2, wherein the first plurality of filter kernels comprises a third filter kernel having a third dilation rate and the group of dilation rates comprises the first dilation rate, followed by the second dilation rate, followed by the first dilation rate, followed by the third dilation rate.

5. The system of claim 4, wherein the first dilation rate is one, the second dilation rate is two and the third dilation rate is four.

6. The system of claim 2, wherein a second filter of the plurality of filters adjacent to the first filter along an axis of the output feature maps comprises a plurality of second filter kernels in the kernel order along the axis.

7. The system of claim 6, wherein the second filter kernels are offset with respect to the filter kernels such that a first input feature map in the predefined order corresponds to the first dilation rate in the first filter and the second dilation rate in the second filter.

8. The system of claim 1, wherein each of the plurality of filters comprises a repeating cyclic dilation rate pattern and wherein adjacent ones of the plurality of filters comprise the repeating cyclic dilation rate pattern shifted with respect to one another.

9. The system of claim 8, wherein a second filter of the plurality of filters immediately adjacent the first filter of the plurality of filters comprises a lead filter kernel having a matching dilation rate to a final filter kernel of the first filter.

10. The system of claim 1, further comprising:
    applying a second CNN layer to the output volume to generate a second output volume, wherein the second CNN layer comprises a plurality of second filters each comprising a second plurality of filter kernels, wherein each filter kernel of the second plurality of filter kernels has a constant filter sample rate and a constant dilation rate.

11. The system of claim 1, wherein the CNN layer is one of a plurality of CNN layers of at least one of an image classification network, an object detection network, a semantic segmentation network, or an image enhancement network.

12. A method, comprising:
    receiving an input volume corresponding to an input image, the input volume comprising a plurality of input feature maps;
    applying a convolutional neural network (CNN) layer to the input volume to generate an output volume comprising a plurality of output feature maps, the CNN layer comprising a plurality of filters each comprising a plurality of filter kernels, wherein a first filter of the plurality of filters comprises a first plurality of filter kernels, wherein a first filter kernel of the first plurality of filter kernels has a first dilation rate and a second filter kernel of the first plurality of filter kernels has a second dilation rate and wherein the first and second filter kernels have a matching sample rate; and
    providing an image output corresponding to the input image based on the plurality of output feature maps.

13. The method of claim 12, wherein the input feature maps are in a predefined order along an axis of the input feature maps and the first plurality of filter kernels are in a kernel order along the axis, wherein the kernel order along the axis comprises a repeating pattern of a group of dilation rates comprising the first dilation rate and the second dilation rate.

14. The method of claim 13, wherein the first plurality of filter kernels comprises a third filter kernel having a third dilation rate and the group of dilation rates comprises the first dilation rate, followed by the second dilation rate, followed by the first dilation rate, followed by the third dilation rate.

15. The method of claim 13, wherein a second filter of the plurality of filters adjacent to the first filter along an axis of the output feature maps comprises a plurality of second filter kernels in the kernel order along the axis.

16. The method of claim 15, wherein the second filter kernels are offset with respect to the filter kernels such that a first input feature map in the predefined order corresponds to the first dilation rate in the first filter and the second dilation rate in the second filter.

17. At least one machine readable storage device comprising a plurality of instructions that, in response to being executed on a device, cause the device to apply a convolutional neural network (CNN) by:
receiving an input volume corresponding to an input image, the input volume comprising a plurality of input feature maps;
applying a CNN layer to the input volume to generate an output volume comprising a plurality of output feature maps, the CNN layer comprising a plurality of filters each comprising a plurality of filter kernels, wherein a first filter of the plurality of filters comprises a first plurality of filter kernels, wherein a first filter kernel of the first plurality of filter kernels has a first dilation rate and a second filter kernel of the first plurality of filter kernels has a second dilation rate and wherein the first and second filter kernels have a matching sample rate; and
providing an image output corresponding to the input image based on the plurality of output feature maps.

18. The machine readable storage device of claim 17, wherein the input feature maps are in a predefined order along an axis of the input feature maps and the first plurality of filter kernels are in a kernel order along the axis, wherein the kernel order along the axis comprises a repeating pattern of a group of dilation rates comprising the first dilation rate and the second dilation rate.

19. The machine readable storage device of claim 18, wherein a second filter of the plurality of filters adjacent to the first filter along an axis of the output feature maps comprises a plurality of second filter kernels in the kernel order along the axis.

20. The machine readable storage device of claim 19, wherein the second filter kernels are offset with respect to the filter kernels such that a first input feature map in the predefined order corresponds to the first dilation rate in the first filter and the second dilation rate in the second filter.

* * * * *